US008660845B1

(12) United States Patent
Sodeifi et al.

(10) Patent No.: US 8,660,845 B1
(45) Date of Patent: Feb. 25, 2014

(54) AUTOMATIC SEPARATION OF AUDIO DATA

(75) Inventors: Nariman Sodeifi, Newcastle, WA (US); David E. Johnston, Duvall, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1106 days.

(21) Appl. No.: 11/873,374

(22) Filed: Oct. 16, 2007

(51) Int. Cl.
*G10L 15/00* (2013.01)

(52) U.S. Cl.
USPC ............ 704/246; 704/247; 704/251; 704/252

(58) Field of Classification Search
None
See application file for complete search history.

(56) References Cited

U.S. PATENT DOCUMENTS 5,920,843 A * 7/1999 Fay ............................... 704/503
7,794,370 B2 * 9/2010 Tackett ........................... 482/83
2002/0121181 A1 * 9/2002 Fay et al. ........................ 84/609
2003/0031334 A1 * 2/2003 Layton et al. ................. 381/310
2004/0137929 A1 * 7/2004 Jones et al. ................... 455/517
2005/0219068 A1 * 10/2005 Jones et al. ..................... 341/50
2005/0254366 A1 * 11/2005 Amar ........................... 369/47.1
2005/0288159 A1 * 12/2005 Tackett ........................... 482/84
2006/0287748 A1 * 12/2006 Layton et al. ................... 700/94
2007/0225967 A1 * 9/2007 Childress et al. ................. 704/9
2007/0225973 A1 * 9/2007 Childress et al. ............. 704/211

* cited by examiner

*Primary Examiner* — Leonard Saint Cyr
(74) *Attorney, Agent, or Firm* — Schwegman Lundberg & Woessner, P.A.

(57) ABSTRACT

Systems and methods for audio editing are provided. In one implementation, a computer-implemented method is provided. The method includes receiving digital audio data including a plurality of distinct vocal components. Each distinct vocal component is automatically identified using one or more attributes that uniquely identify each distinct vocal component. The audio data is separated into two or more individual tracks where each individual track comprises audio data corresponding to one distinct vocal component. The separated individual tracks are then made available for further processing.

22 Claims, 7 Drawing Sheets

AUTOMATIC SEPARATION OF AUDIO DATA

BACKGROUND

The present disclosure relates to editing digital audio data.

Digital audio data can include audio data in different digital audio tracks. Tracks are typically distinct audio files. Tracks can be generated mechanically (e.g., using a distinct microphone as an input source for each track), synthesized (e.g., using a digital synthesizer), or generated as a combination of any number of individual tracks. The audio data can represent, for example, voices (e.g., conversations between people), and other sounds (e.g., noise, music). For example, a particular track can include a foreground conversation between people and a background component that can include sounds occurring naturally in an environment where the people are speaking. The background component can also include sounds added to the environment to provide a specific effect (e.g., sound effects or music).

A track includes one or more channels (e.g., a stereo track can include two channels, left and right). A channel is a stream of audio samples. For example, a channel can be generated by converting an analog input from a microphone into digital samples using a digital analog converter.

The audio data for a track can be displayed in various visual representations. For example, an amplitude display shows a representation of audio intensity in the time-domain (e.g., a graphical display with time on the x-axis and amplitude on the y-axis). Similarly, a frequency spectrogram shows a representation of frequencies of the audio data in the time-domain (e.g., a graphical display with time on the x-axis and frequency on the y-axis). Tracks can be played and analyzed alone or in combination with other tracks. Additionally, the audio data of one or more tracks can be edited. For example, the digital audio data can be adjusted by a user to increase amplitude of the audio data for a particular track (e.g., by increasing the overall intensity of the audio data) across time. In another example, the amplitude of audio data can be adjusted over a specified frequency range. This is typically referred to as equalization.

SUMMARY

In one implementation, a computer-implemented method is provided. The method includes receiving digital audio data including a plurality of distinct vocal components. Each distinct vocal component is automatically identified using one or more attributes that uniquely identify each distinct vocal component. The audio data is separated into two or more individual tracks where each individual track comprises audio data corresponding to one distinct vocal component. The separated individual tracks are then made available for further processing and output (e.g., editing, displaying, or storing).

Embodiments of this aspect can include apparatus, systems, and computer program products.

Implementations of the aspect can include one or more of the following features. Receiving digital audio data can include displaying a visual representation of the audio data for the separated individual tracks. The visual representation can include a display of the respective vocal component of the track with respect to a feature of the audio data on a feature axis and with respect to time on a time axis.

Receiving digital audio data can further include receiving a selection of a first separated individual track, receiving a selection of a portion of the audio data of the selected individual, receiving a selection of a specified modification to apply to the selected portion of the audio data, applying the specified modification to the portion of the audio data to form a modified separated individual track, and combining the audio data of one or more separated individual tracks and the modified separated individual track to form a combined track.

The attributes used to uniquely identify the distinct vocal components can be selected from a group of audio attributes including at least base pitch, formant location, formant shape, plausives, rhythm, meter, cadence, beat, frequency, equalization fingerprint, compression fingerprint, background noise and volume.

Identifying a particular vocal component can include analyzing the audio data to identify baseline values for the one or more attributes that correspond to particular vocal components, and comparing the actual values of the attributes for audio data at particular points in time with the baseline values to determine which vocal component the audio data at that time belongs.

The audio data can also include non-vocal components, and separating the audio data into two or more individual tracks can include creating one or more individual tracks of non-vocal component data. Each vocal component can include one or more non-overlapping segments of audio data.

In one implementation, another computer implemented method is provided. The method includes receiving digital audio data including a plurality of distinct vocal components. The method also includes receiving one or more selections of distinct regions of audio data, where each region corresponds to a distinct vocal component. The selected regions are used to identify the corresponding vocal components within the audio data by using values of one or more attributes of the audio data in each selected region to identify other audio data corresponding to the particular vocal component of the selected region. The audio data is separated into two or more individual tracks where each individual track comprises audio data corresponding to one distinct vocal component. The separated individual tracks are then made available for further processing and output (e.g., editing, displaying, or storing).

Particular embodiments of the subject matter described in this specification can be implemented to realize one or more of the following advantages. Individual non-overlapping voices can be automatically separated from audio data, saving time over a manual identification and separation process that requires a user to listen and identify occurrences of individual voices. Additionally, the voices are automatically identified and separated using a combination of audio attributes, which provides a more accurate and consistent separation of vocal components as compared to a manual process reliant on the sensory abilities of a given individual user.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
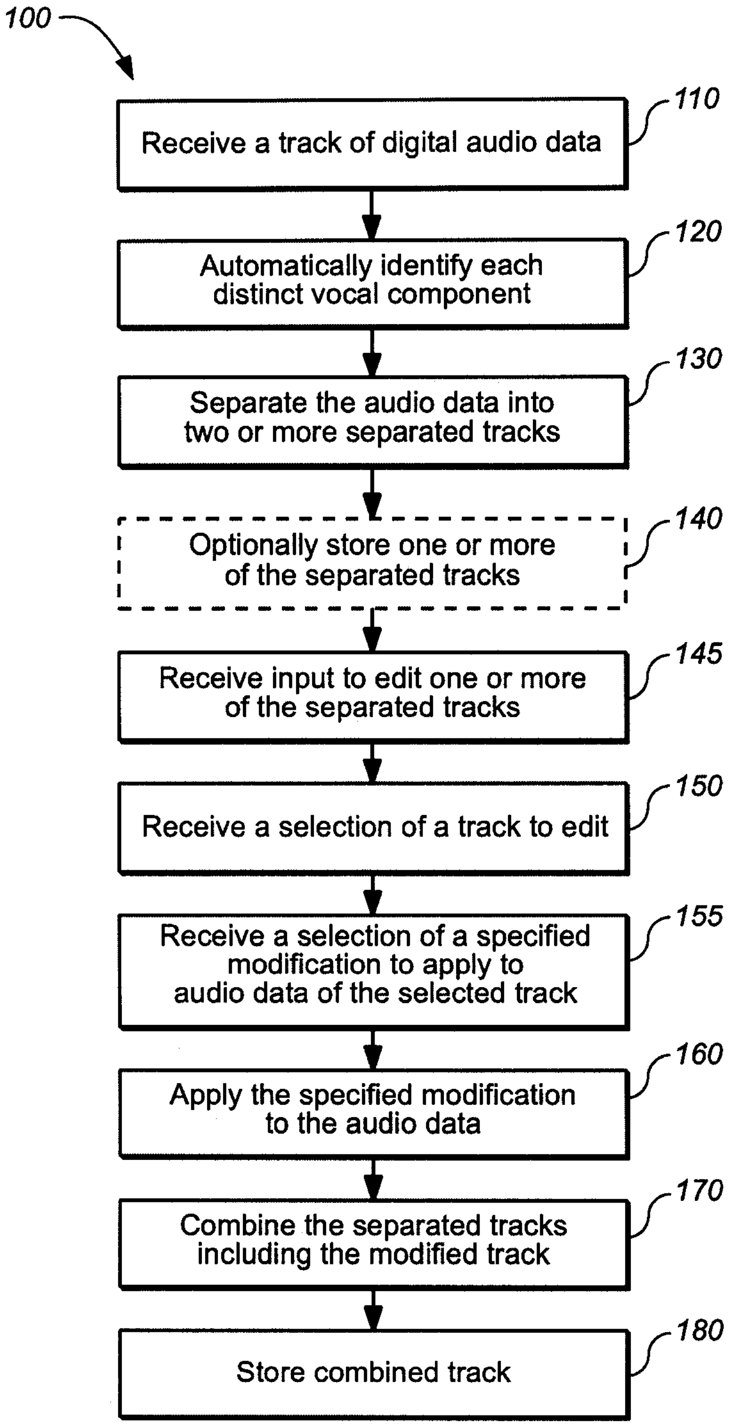
FIG. 1 is a flowchart of an example method for automatically separating audio data.

FIG. 1 is a flowchart of an example method 100 for automatically separating audio data. For convenience, the method 100 will be described with reference to a system that performs the method 100. The system receives 110 a track of digital audio data. The audio data can be initially stored as a single track (e.g., when the audio data is generated). Alternatively, the received track can be, for example, a mixdown combining multiple tracks. The audio data can be received in response to a user input to the system selecting particular audio data (e.g., to edit). The audio data may also be received for other purposes (e.g., for review by the user). In some implementations, the system receives the audio data from a storage device local or remote to the system.

In some implementations, the system displays a visual representation the received audio data of the track with respect to a feature of the audio data (e.g., amplitude or frequency), on a feature axis (e.g., on the y-axis) and with respect to time (e.g., in seconds), on a time axis (e.g., on the x-axis).

Figure 2:
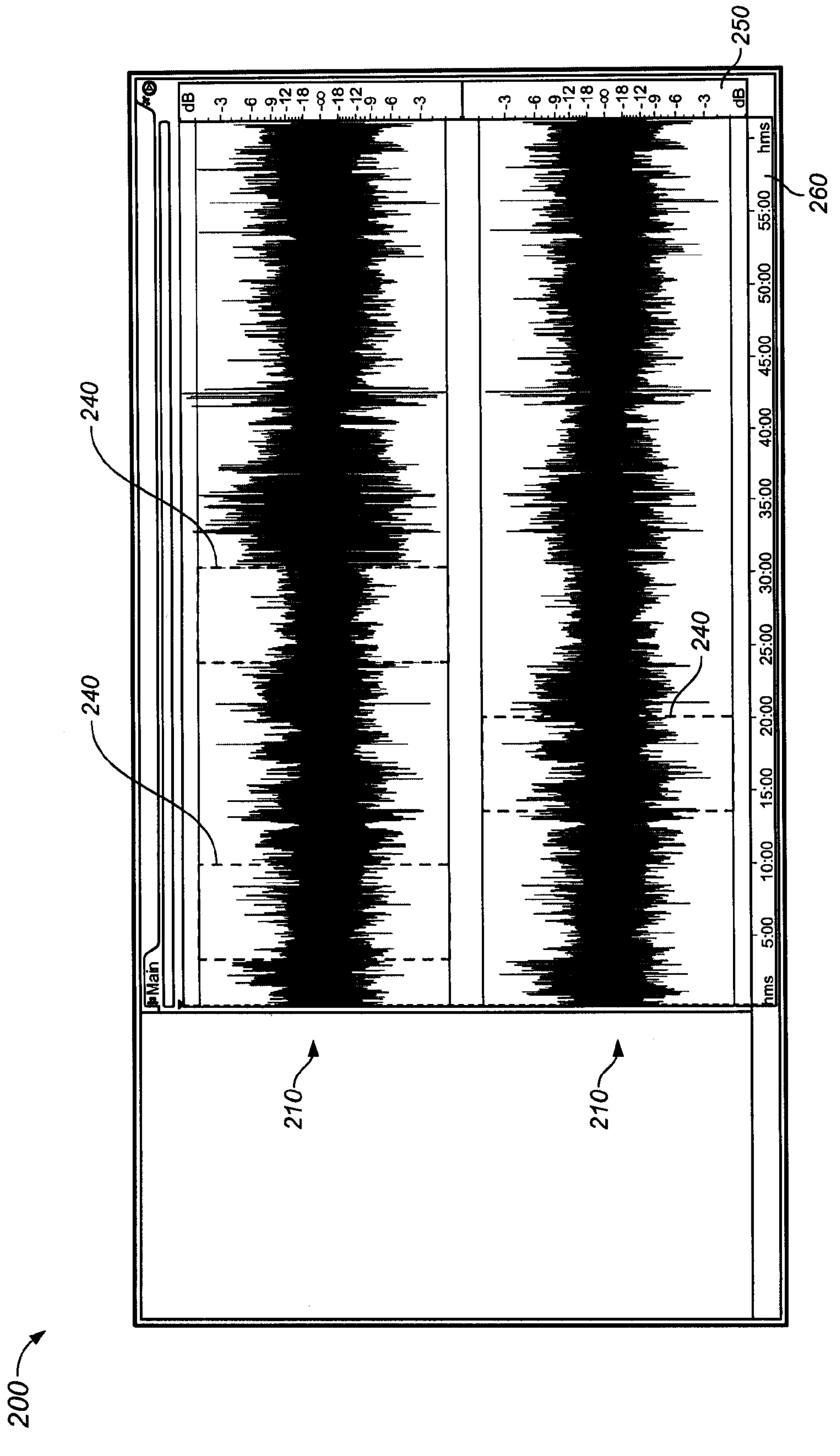
FIG. 2 is an example display of a single track of digital audio data.

FIG. 2 is an example display 200 providing a visual representation of the audio data from a track 210. The display 200 shows the track 210 as including audio data from two separate channels (e.g., left and right channels of stereo audio data). The track 210 of audio data includes a feature axis 250 (e.g., representing amplitude), and a time axis 260. The track 210 can include audio data corresponding to particular audio sources, for example, two or more voices with or without additional audio data (e.g., music, noise, or other audio components).

The track 210 of audio data includes two or more distinct vocal components (e.g., two or more individuals speaking). Each vocal component includes a collection of one or more segments 240 of audio data where an individual person is speaking. Each segment can be continuous audio data corresponding to the particular vocal component. Distinct segments can be discontinuous where the collection of segments identifies the vocal component for the individual.

In some implementations, the segments of audio data overlap at one or more points in time, for example, when two or more individuals are speaking at the same time. In other implementations, the segments of audio data do not overlap at any point in time. In some implementations, the display of the audio data will include one or more periods of time where there is no vocal component (e.g., no voices are heard during that period of time).

For convenience, the method 100, will be described with respect to audio data including two or more distinct vocal components ("distinct voices"), and no background sound. However, the method 100 can also be applied to audio data comprising two or more voices with other sounds (e.g., background sound). In some implementations, these other sounds can be identified, separated onto one or more individual tracks, and edited. In some implementations, the other sounds include non-vocal component data (e.g., music or added effects). In other implementations, the other sounds can include a noise component. The noise component can be associated with a particular vocal component (e.g., a vocal component from a source location having a background noise).

Figure 7:
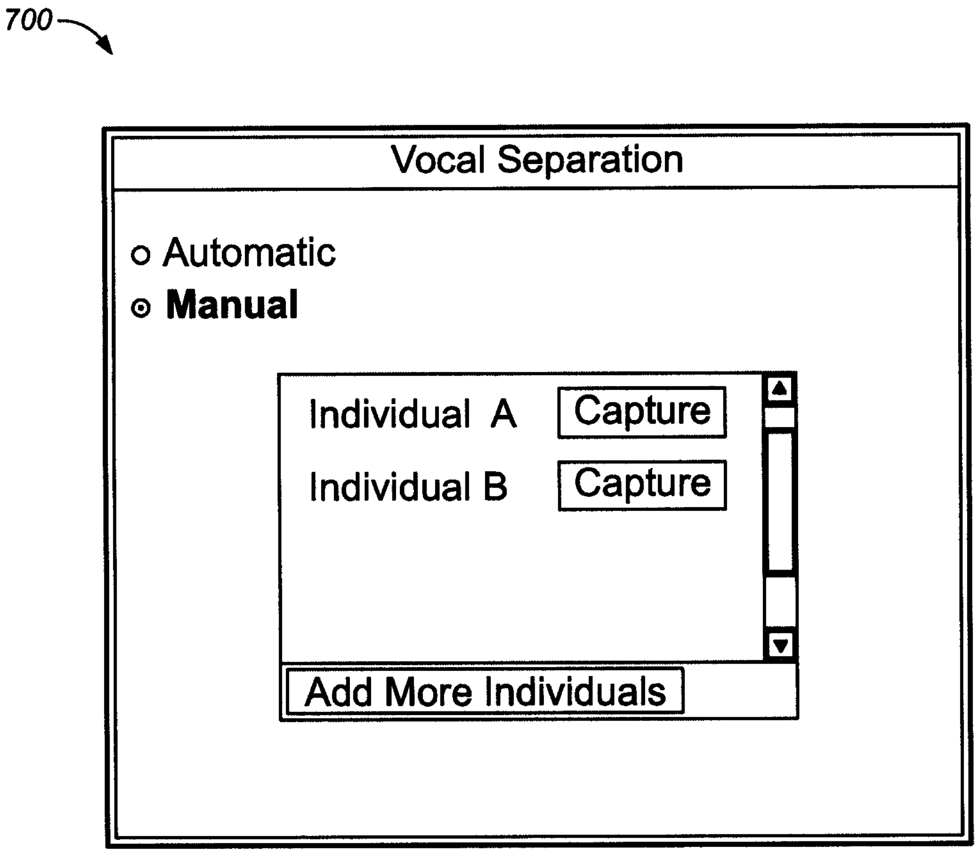
FIG. 7 is an example display of a vocal separation tool for identifying vocal components of audio data.

After receiving the digital audio data, the system automatically identifies 120 each distinct vocal component in the audio data. In some implementations, the user selects between an automatic and manual identification of vocal components. FIG. 7 is an example display of a vocal separation tool for identifying vocal components of audio data. The user can selects a separation type (e.g., manual, automatic). When the automatic separation type is selected, the system automatically identifies and separates distinct vocal components in the audio data. In alternative implementations, automatic separation is the default separation type such that the user does not need to select a separation type except to change the selection type from the default.

Automatically identifying distinct vocal components includes analyzing the audio data for attributes having unique values that identify a distinct vocal component. For example, the system can examine the digital audio data of the track one or more times to identify values associated with the one or more attributes in order to identify particular values uniquely associated with each vocal component. The attributes can include, for example, base pitch, formant location, formant shape, plausives, rhythm, meter, cadence, beat, frequency, equalization fingerprint, compression fingerprint, background noise and volume.

To automatically identify each distinct vocal component, the system examines the audio data for one or more specified attributes. For example, if attributes a, b, and c are used to identify distinct vocal components, the system examines the audio data for values associated with attributes a, b, and c. In some implementations, the examination includes sampling the audio data at particular points in time. In other implementations, the system examines the entire audio data at particular time intervals (e.g., at each 1/10 of a second).

The system then determines whether the identified values for each quality cluster around one or more values. For example, if the audio data includes two distinct vocal components corresponding to two individual voices, the values for the attributes a, b, and c can cluster about two groups of values, one group for each distinct vocal component. The average value of each quality in the cluster is used as a baseline value for that quality for a particular vocal component. When several attributes are used in combination to identify a vocal components, a center point of the cluster is identified to provide the baseline values for the attributes.

The audio data corresponding to each vocal component is identified including comparing the actual quality values over time with the baseline quality values. For example, for a first vocal component having determined baseline quality values of a1, b1, and c1, the distance from the actual values of the attributes a, b, and c at a particular point in time is calculated to determine whether the actual values are within a threshold distance. If the actual values are within the threshold distance, than the audio data at that point in time is associated with the first vocal component. Similarly, the second vocal component has baseline values for the attributes of a2, b2, and c2 based on the clustering of values associated with the second vocal component.

In some implementations, the distance at a particular location in time for the audio data is determined by calculating a weighted N-dimensional distance for a vector of quality values at that particular point in time t:

$$d_t = \sqrt{w_a(a-a1)^2 + w_b(b-b1)^2 + w_c(c-c1)^2},$$

where $w_x$ is a weighting factor for attribute x, and a1, b1, c1 are the baseline quality values associated with the first vocal component and a, b, and c are the current values of the attributes at that location in the audio data. The N-dimensional distance formula can be scaled to any number of attributes being used. Additionally, the distance calculation is performed for each vocal component (e.g., for each unique group of values determined for attributes a, b, and c).

In some alternative implementations, the user manually identifies a portion of an individual vocal component to the system, and the system then automatically identifies values for the attributes (a, b, c, . . . ) for that vocal component using the actual values for those attributes in a portion of the audio data identified by the user as belonging to a particular vocal component. This will be discussed in greater detail below with reference to FIG. 6.

Once the one or more vocal components are identified for every location in the audio data, the system separates 130 the audio data into two or more separated tracks. In some implementations, the audio data corresponding to each distinctly identified vocal component is placed in a separate track. Additionally, the system can preserve the location of segments of the vocal components with respect to time when placing each vocal component in a separated track.

Figure 3:
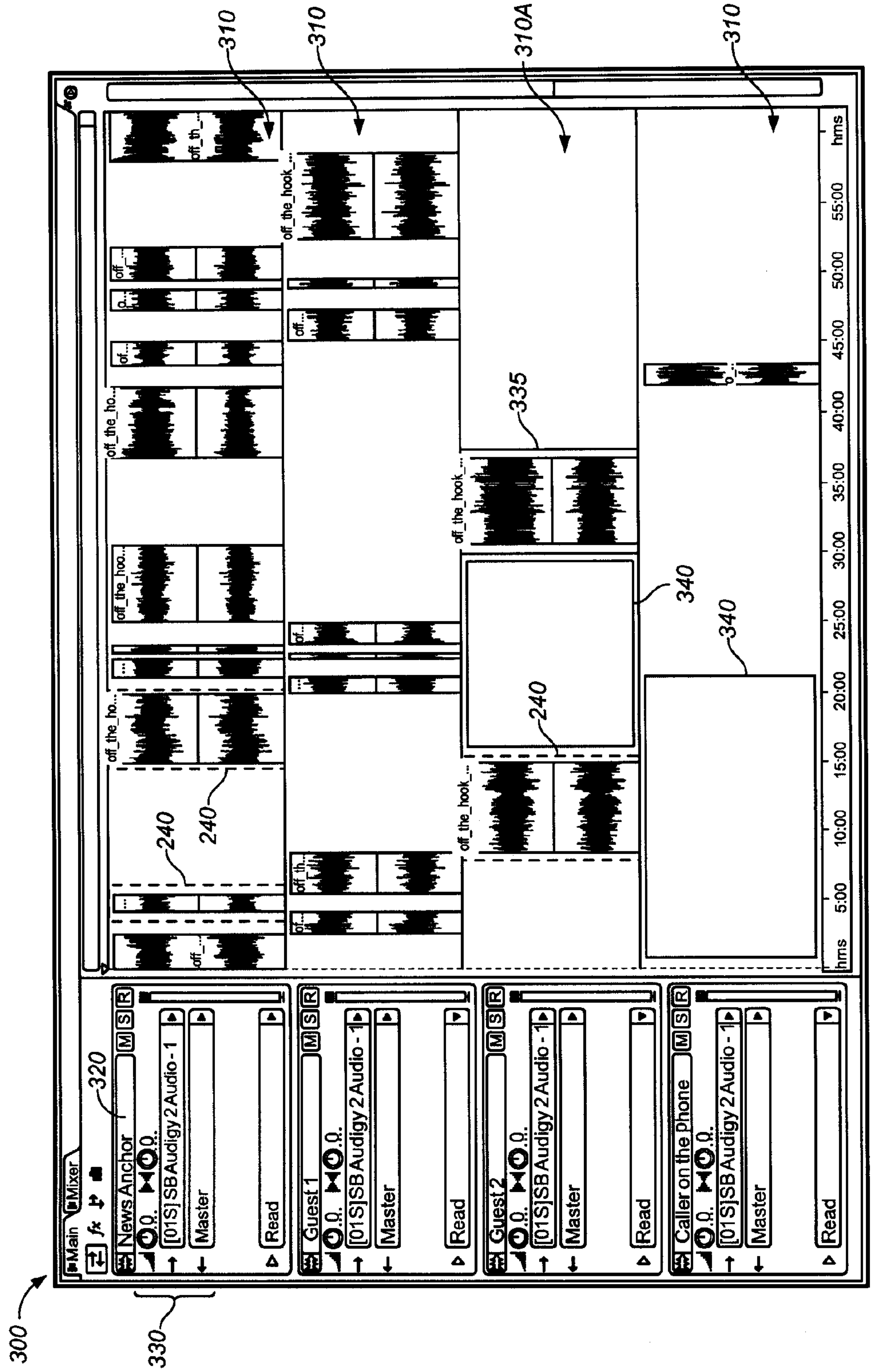
FIG. 3 is an example display of the single track of FIG. 2, where individual vocal components have been identified and separated into individual tracks.

FIG. 3 is an example display 300 of the audio data of a track 210 of FIG. 2, where individual vocal components have been identified and separated into four individual separated tracks 310 (e.g., one track for each distinct vocal component). Each vocal component in the separated tracks 310 includes one or more segments 240 identifying discontinuous parts of the respective vocal component. As described above, the segments 240 of audio data may or may not overlap at any point in time, and the display of the vocal component can include one or more periods of time where there is no segment of audio data 340. In some implementations, each separated track 310 includes an identifier 320 for the individual track (e.g., a text box for naming the track). Additionally, each individual track can include audio controls 330 (e.g., pan and volume), for processing (e.g., editing), the audio date of the corresponding track.

Once the identified vocal components have been placed in the corresponding separated tracks, the system optionally stores 140 the separated tracks. In some implementations, the system stores one or more of the separated tracks in response to user input specifying one or more of the separated tracks to be stored.

Additionally, the user can edit the audio data of one or more of the separated tracks. In some implementations, before storing, the user edits a particular vocal component, and then combines the multiple separated tracks, including the edited vocal component, into a single track of audio data, as described in greater detail below.

As shown in FIG. 1, the system receives an input 145 to edit one or more of the separated tracks (e.g., separated tracks 310). The user can edit a portion or all of the vocal components in each of the separated tracks. A user may choose to edit a vocal component of a particular separated track, for example, because the audio data (e.g., of a speaker), of the vocal component is too quiet, too loud, or requires some type of modification to better clarify the vocal component for the listener. The audio data of the track can be edited as a whole in order to edit the entire vocal component (e.g., by increasing the gain for all audio data in the track). For example, the user can choose to select the entire track, select the modification, and apply the modification to track. Alternatively, in some implementations, a user can select a particular portion of the audio data in a track in order to edit only that portion. For example, the audio data for a vocal component can be too quite, two loud, or require another modification over a particular time range.

In order to edit a particular portion of the audio data in a track, the user selects 150 the particular separated track (e.g., track 310A of FIG. 3). After selecting the separated track, the user selects the portion of the displayed audio data (e.g., by demarcating a region of the displayed audio data using a selection tool) including the audio data for editing (e.g., portion 335 of FIG. 3).

Figure 4:
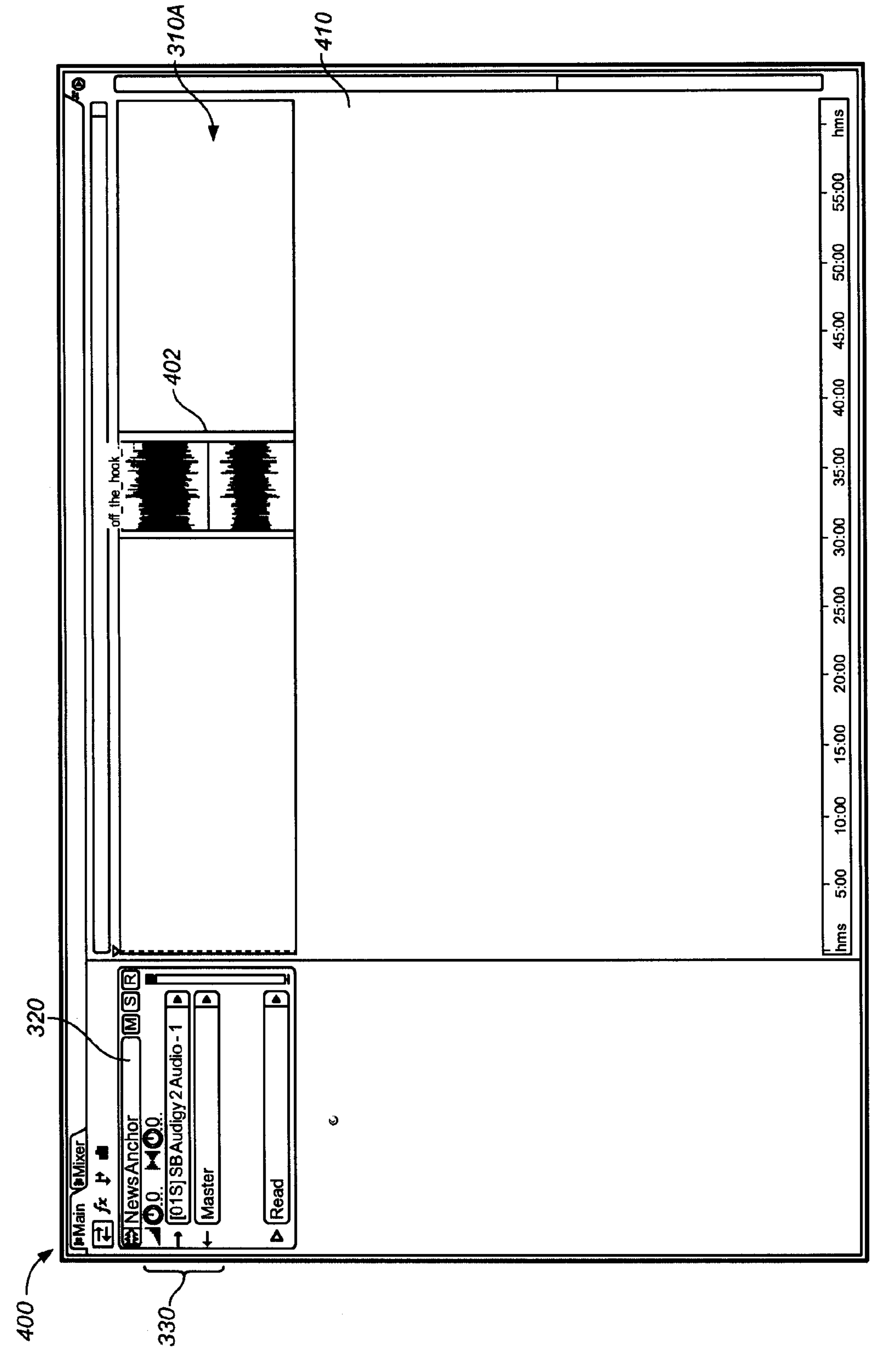
FIG. 4 is an example display of an effect applied to a selected portion of a vocal component.

FIG. 4 is an example display 400 of an effect applied to a selected portion of a vocal component. In FIG. 4, the selected portion 335 is displayed on track 310A in isolation as portion 402 which is viewable and modifiable (e.g., as a magnified view of the portion 335). The display 410 includes tools 320 for identifying the portion 402 (e.g., using a text box), and includes audio controls 330 for modifying track 310A, including the selected portion 402. Editing of the portion 402 can be performed using the audio controls 330 (e.g., modification capabilities internal to the system) to perform a specified modification to the audio data of the portion 402. In some implementations, modifications are performed using audio effects external to the system (e.g., effects imported into the application). In an alternative implementation, the user can edit the selected portion 335 directly within the display 300 of the separated tracks 310.

As shown in FIG. 1, once the user has selected the portion for editing, the user specifies a type of modification 155 (e.g., amplification or equalization) to be performed on the portion. Using the type of modification specified by the user, the system applies 160 the modification to the selected portion. The application of the specified modification to the selected portion results in a modified version of the selected portion and a modified version of the separated track containing the vocal component including the selected portion. In some implementations, the display of the audio data in the separated track is updated to show the modification.

After the modified version of the selected portion has been incorporated into the individual track, the system combines 170 audio data for one or more of the individual tracks of audio data with the modified version of the individual track to generate a combined track.

Figure 5:
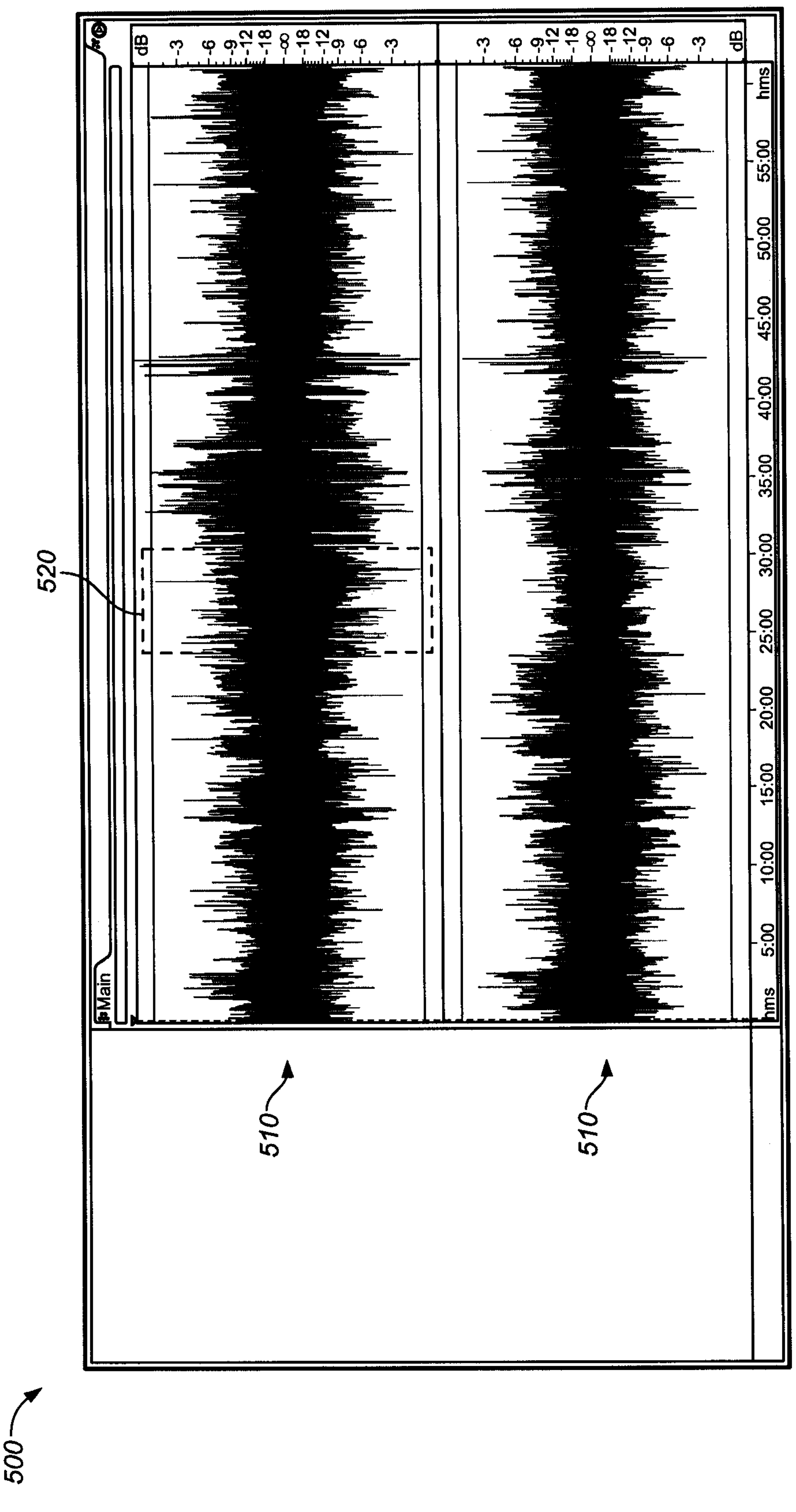
FIG. 5 is an example of a combined track.

FIG. 5 is an example display 500 of a combined track 510. The combined track 510 incorporates the audio data of the separated tracks including the modified version of the individual track. The individual track represents the selected vocal component, and includes the modified version of the selected portion 520.

Once the combined track has been generated, the system stores 180 the combined track. The combined track can be separated and combined any number of times in the manner described above, in order to perform other modifications to portions of the audio data. For example, if the modified version of the selected portion and the individual track require further modification (e.g., the vocal component is are not loud enough, soft enough, or clear enough when incorporated into the combined track), the user can again automatically separate one or more of the vocal components (e.g., in the original single track of audio data or in the combined track of audio data), for example, by repeating the method described above for separating, modifying and combining the audio data. In some implementations, if the user or the system stored the separated tracks as individual tracks, the user can select an individual track from the stored separated tracks, repeating the method 100 described above for modifying and combining the audio data.

Figure 6:
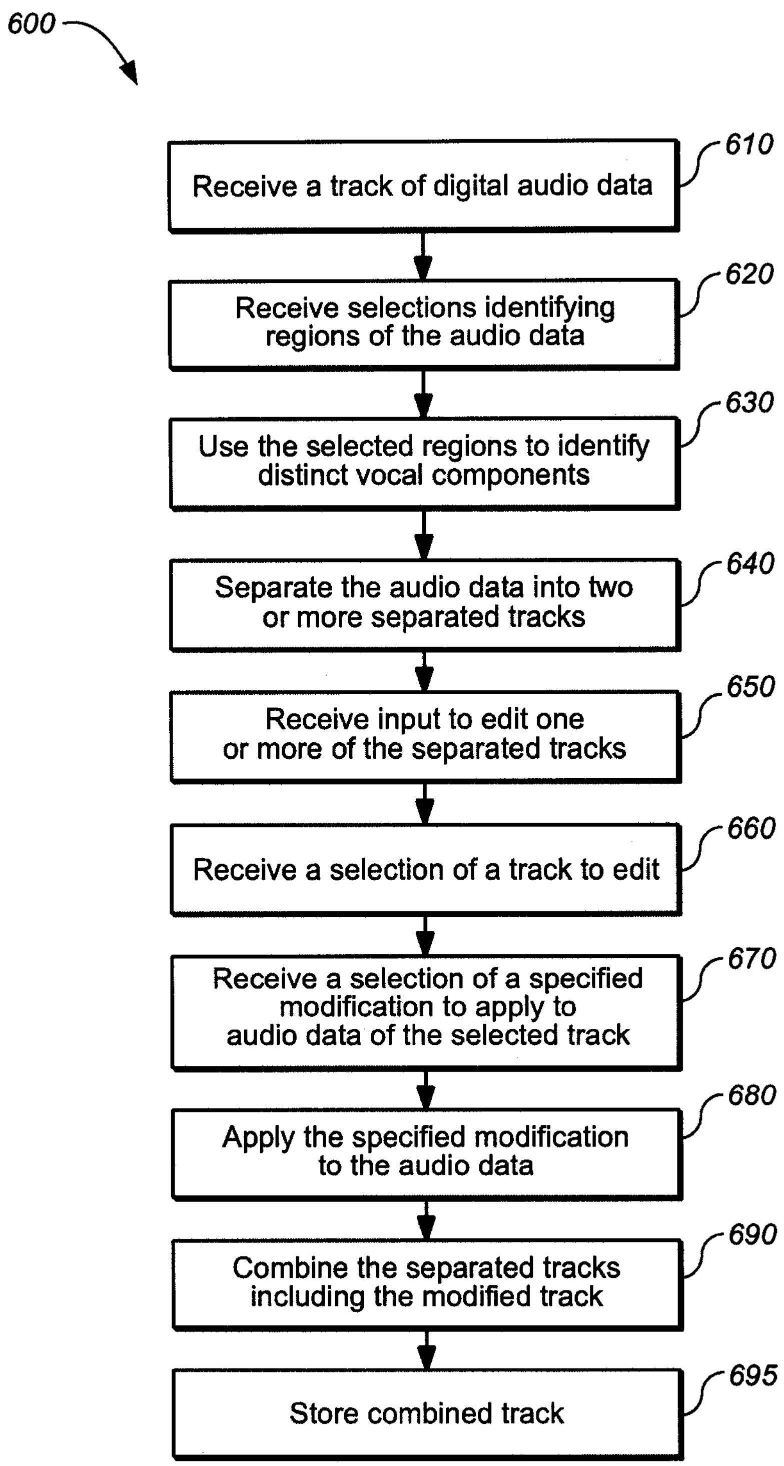
FIG. 6 is a flowchart of an example method for manually identifying vocal components of audio data for automatic separation.

In some implementations, the user manually identifies the individual vocal components to the system. FIG. 6 is a flowchart of an example method 600 for manually identifying vocal components of audio data for automatic separation. In some implementations, where a single track of digital audio data has been received by the system 610, the user of the system manually identifies (e.g., using a visual representation of the audio data to identify vocal components), and selects (e.g., using a selection tool to select regions of a particular vocal component) regions of the audio data 620 corresponding to individual vocal components (e.g., individuals speaking).

The system uses the selected regions to identify 630 vocal components. In particular, the system analyzes the identified selected regions of audio data based on the one or more unique attributes of the particular vocal component to identify one or more corresponding vocal components. As noted above, FIG. 7 is an example display of a vocal separation tool for identifying vocal components of audio data. Once the user has manually identified a region of audio data, the user can select a separation type (e.g., manual, automatic). When the manual separation type is selected, the user can also select a particular individual (e.g., individual A) in the vocal separation tool 700. For example, the user can select a particular individual by clicking on a button (e.g., a capture button). Additionally, in some implementations, a user provides input editing the default titles used to indicate the individual vocal components (e.g., if individual A is the default title, individual A can be changed to Bob if Bob is the person speaking).

Once the user selects a particular individual, the system identifies the values of particular attributes within the selected region of the audio data associated with the selected individual. The system then uses the values of the attributes to determine baseline values for the attributes as associated with a particular vocal component. Other audio data of the vocal component can then be identified using the distance calculation described above. Each vocal component of the audio data (e.g., individuals B, C, D, etc.) can be identified in a similar manner by repeating the steps described above with regard to individual A.

Once a vocal component is identified for every location in the single track of audio data, the system separates 640 the audio data into two or more separated tracks (e.g., as shown in FIG. 3). Each separated track includes audio data corresponding to a particular identified vocal component.

The system receives an input 650 to edit one or more of the separated tracks. The system receives 660 a selection of a track to edit. In some implementations, the user can edit an entire separated track. Alternatively, the user can edit an identified portion of a separated track. In order to edit a particular portion, the system receives a selection of a portion of the track for editing. For example, the user can use a selection tool to demarcate a portion of displayed audio data in the track. Once the user has selected the portion, the user specifies a type of modification 670 to be performed on the portion. Using the type of modification specified by the user, the system applies the specified modification 680 to the selected portion. The application of the specified modification to the selected portion results in a modified version of the selected portion and a modified version of the separated track that includes the selected portion.

The system combines 690 one or more of the separated tracks of audio data with the modified version of the separated track to generate a combined track. Once the combined track has been created, the system stores 695 the combined track or repeats the process to perform additional editing operations on the audio data.

Alternative implementations include manually or automatically separating vocal components within the audio data by assigning an entire segment of the audio data to the nearest identified vocal component. Thus, instead of separating only the vocal component to an individual track, all other audio data included with the particular vocal component is moved to the track (e.g., background music). For example, if particular audio data includes two distinct non-overlapping vocal components along with background music, the system identifies portions of the audio data corresponding to each vocal component. All the audio data within each portion is moved to the corresponding track. For example, if a first voice occurs from time zero to time 10 seconds, all audio data from 0-10 seconds is moved to a corresponding track for the first vocal component (i.e., including any non-vocal audio data), not just the audio data corresponding to the particular vocal component.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:

receiving a track including one or more channels, each channel being a continuous stream of audio samples over an identical period of time comprising a plurality of sequential time segments, and each channel including audio samples from multiple distinct voices;

automatically identifying individual time segments of the plurality of sequential time segments, each individual time segment corresponding to a distinct voice across all of the one or more channels of the track;

generating multiple tracks from the single track, each of the multiple tracks including audio samples from all of the one or more channels that occurred during an individual time segment corresponding to the same distinct voice to provide a distinct track having all of the one or more channels and corresponding to the distinct voice;

and storing each of the multiple tracks for further processing.

2. The method of claim 1 further comprising displaying a visual representation for the multiple tracks, wherein the visual representation displays the individual time segments of audio data of the track with respect to a feature of the individual time segments of audio data on a feature axis and with respect to time on a time axis.

3. The method of claim 2, further comprising:

receiving a selection of a first separated track;

receiving a selection of a portion of the audio samples of the selected track;

receiving a selection of a specified modification to apply to the selected portion of the audio samples;

applying the specified modification to the portion of the audio samples to form a modified separated track; and combining the audio samples of one or more separated tracks and the modified separated track to form a combined track.

4. The method of claim 1, where the automatically identifying uses attributes used to uniquely identify distinct individuals, the attributes selected from a group of audio attributes, the group including at least base pitch, formant location, formant shape, plausives, rhythm, meter, cadence, beat, frequency, equalization fingerprint, compression fingerprint, background noise and volume.

5. The method of claim 1, where the automatically identifying comprises:

analyzing the audio samples to identify baseline values for one or more attributes that correspond to a particular individual; and comparing actual values of the attributes for audio samples at particular points in time with the baseline values to determine which individual the audio samples at that time belongs.

6. The method of claim 1, wherein the audio samples further comprises non-vocal components, and wherein generating the track comprises creating one or more tracks of non-vocal component data.

7. The method of claim 1, where the time segments for one individual are non-overlapping at one or more points in time with respect to the time segments for other individuals.

8. A computer-implemented method comprising:

receiving digital audio data as a single track, the audio data including one or more channels, each channel being a continuous stream of audio samples over an identical first period of time comprising a plurality of sequential time segments, and each channel including audio samples from multiple distinct voices;

receiving one or more selections of time segments across all of the one or more channels using the selected time segments to identify the corresponding individual within the audio data, including using values of one or more attributes of the audio data in each selected time segment to identify other audio data corresponding to the particular individual of the selected time segment;

generating multiple tracks from the audio data, each of the multiple tracks including audio samples from all of the one or more channels that occurred during an individual time segment corresponding to the same particular individual to provide a distinct track having all of the one or more channels and corresponding to the distinct individual; and storing each of the multiple tracks for additional processing.

9. A computer program product, encoded on a non-transitory computer-readable medium, operable to cause data processing apparatus to perform operations comprising:

receiving a track including one or more channels, each channel being a continuous stream of audio samples over an identical period of time comprising a plurality of sequential time segments, and each channel including audio samples from multiple distinct voices;

automatically identifying individual time segments of the plurality of sequential time segments, each individual time segment corresponding to a distinct voice across all of the one or more channels of the track;

generating multiple tracks from the single track, each of the multiple tracks including audio samples from all of the one or more channels that occurred during an individual time segment corresponding to the same distinct voice to provide a distinct track having all of the one or more channels and corresponding to the distinct voice;

and storing each of the multiple tracks for further processing.

10. The computer program product of claim 9 further comprising displaying a visual representation of the audio samples for the multiple tracks, wherein the visual representation displays the respective segments of audio samples of the track with respect to a feature of the segments of audio samples on a feature axis and with respect to time on a time axis.

11. The computer program product of claim 10, further comprising:

receiving a selection of a first separated track;

receiving a selection of a portion of the audio samples of the selected track;

receiving a selection of a specified modification to apply to the selected portion of the audio samples;

applying the specified modification to the portion of the audio samples to form a modified separated track; and combining the audio samples of one or more separated tracks and the modified separated track to form a combined track.

12. The computer program product of claim 9, where the automatically identifying uses attributes used to uniquely identify distinct individuals, the attributes selected from a group of audio attributes, the group including at least base pitch, formant location, formant shape, plausives, rhythm, meter, cadence, beat, frequency, equalization fingerprint, compression fingerprint, background noise and volume.

13. The computer program product of claim 9, where the automatically identifying comprises:

analyzing the audio samples to identify baseline values for one or more attributes that correspond to a particular individual; and comparing actual values of the attributes for audio samples at particular points in time with the baseline values to determine which individual the audio samples at that time belongs.

14. The computer program product of claim 9, wherein the audio samples further comprises non-vocal components, and wherein generating the track comprises creating one or more tracks of non-vocal component data.

15. The computer program product of claim 9, where the time segments for one individual are non-overlapping at one or more points in time with respect to the time segments for other individuals.

16. A system comprising:

means for receiving a track including one or more channels, each channel being a continuous stream of audio samples over an identical period of time comprising a plurality of sequential time segments, and each channel including audio samples from multiple distinct voices;

means for automatically identifying individual time segments of the plurality of sequential time segments, each individual time segment corresponding to a distinct voice across all of the one or more channels of the track;

means for generating multiple tracks from the single track, each of the multiple tracks including audio samples from all of the one or more channels that occurred during an individual time segment corresponding to the same distinct voice to provide a distinct track having all of the one or more channels and corresponding to the distinct voice;

and means for storing each of the multiple tracks for further processing.

17. The system of claim 16 further comprising means for displaying a visual representation of the audio samples for the multiple tracks, wherein the visual representation displays the respective segments of audio samples of the track with respect to a feature of the segments of audio samples on a feature axis and with respect to time on a time axis.

18. The system of claim 17, further comprising:

means for receiving a selection of a first separated track;

means for receiving a selection of a portion of the audio samples of the selected track;

means for receiving a selection of a specified modification to apply to the selected portion of the audio samples;

means for applying the specified modification to the portion of the audio samples to form a modified separated track; and means for combining the audio samples of one or more separated tracks and the modified separated track to form a combined track.

19. The system of claim 16, where the means for automatically identifying uses attributes used to uniquely identify the distinct individuals, the attributes selected from a group of audio attributes, the group including at least base pitch, formant location, formant shape, plausives, rhythm, meter, cadence, beat, frequency, equalization fingerprint, compression fingerprint, background noise and volume.

20. The system of claim 16, where automatically identifying comprises:

analyzing the audio samples to identify baseline values for one or more attributes that correspond to a particular individual; and comparing actual values of the attributes for audio samples at particular points in time with the baseline values to determine which individual the audio samples at that time belongs.

21. The system of claim 16, wherein the audio samples further comprises non-vocal components, and wherein generating the track comprises creating one or more tracks of non-vocal component data.

22. The system of claim 16, where the time segments for one individual are non-overlapping at one or more points in time with respect to the time segments for other individuals.

* * * * *